The United States.

To all to whom these Presents shall come_Greeting_

Whereas Francis Bailey of the City of Philadelphia in the State of Pennsylvania, Printer, hath invented certain Methods not before known or used, forming Punches, by which to impress on the . . . Matrices of printing Types, whether such Types be for Letters or Devices as well as to impress on any Metal or other Substance capable of receiving and retaining Impressions various Marks which are difficult to be counterfeited; and the said Invention appears to be useful and important: These are therefore in pursuance of the Act, entituled "An Act to promote the progress of Useful Arts", to grant to the said Francis Bailey, his Heirs, Administrators and Assigns, for the Term of fourteen Years, the sole and exclusive Right and Liberty of using, and vending to others the said Improvement, according to the true Intent and Meaning of the Act aforesaid.

In Testimony whereof I have caused these Letters to be made patent, and the Seal of the United States to be hereunto affixed. Given under my Hand at the City of Philadelphia this Twenty ninth Day of January in the Year of our Lord one thousand seven hundred and Ninety one and of the Independence of the United States of America the Fifteenth.

Type Patent

Delivered to the within named Francis Bailey this thirty first of January 1791

Th: Jefferson

City of Philadelphia January 29th 1791.

I do hereby certify that the foregoing Letters patent were delivered to me in pursuance of the Act entituled "An Act to promote the progress of useful Arts"; that I have examined the same, and find them conformable to the said Act ——————

Edm Randolph
Attorney general
of the
United States

G: Washington
By the President
Th: Jefferson